(12) United States Patent
Rubin

(10) Patent No.: US 7,623,410 B1
(45) Date of Patent: Nov. 24, 2009

(54) HARD REAL-TIME ADAPTIVE WAVEFORM SYNTHESIS AND EVOLUTION

(75) Inventor: Stuart Harvey Rubin, San Diego, CA (US)

(73) Assignee: United States of American as represented by the Secretary of the Navy, Washington, DC (US)

(*) Notice: Subject to any disclaimer, the term of this patent is extended or adjusted under 35 U.S.C. 154(b) by 480 days.

(21) Appl. No.: 11/691,080

(22) Filed: Mar. 26, 2007

(51) Int. Cl.
*G03B 42/06* (2006.01)
(52) U.S. Cl. .......................................................... 367/7
(58) Field of Classification Search .................. 367/7, 367/92, 95, 137
See application file for complete search history.

(56) References Cited

U.S. PATENT DOCUMENTS 4,603,408 A * 7/1986 Singhal et al. ................ 367/92

2007/0274152 A1 * 11/2007 Rees ............................. 367/7

* cited by examiner

*Primary Examiner*—Adolf Berhane
(74) *Attorney, Agent, or Firm*—Kyle Eppele; J. Eric Anderson

(57) ABSTRACT

A method for hard real-time adaptive wave modulation, comprising: populating a case base with waveform pairs, each waveform pair comprising a primary waveform, and a secondary waveform, wherein the primary waveform induces the secondary waveform; synthesizing a known target waveform s(t) by selecting waveform pairs from the case base such that the expression $\|s(t)-g\|_2$ is minimized, where g is the secondary waveform; and mutating the primary waveforms for each waveform pair based on a normal distribution until $\|s(t)-g'\|_2 < \|s(t)-g\|_2$ where g' is a new secondary waveform induced by the mutated primary waveform.

10 Claims, 4 Drawing Sheets

HARD REAL-TIME ADAPTIVE WAVEFORM SYNTHESIS AND EVOLUTION

FEDERALLY-SPONSORED RESEARCH AND DEVELOPMENT

This invention was developed with federal funds and is assigned to the United States Government. Licensing and technical inquiries may be directed to the Office of Patent Counsel, Space and Naval Warfare Systems Center, San Diego, Code 20012, San Diego, Calif., 92152; telephone (619) 553-3001, facsimile (619) 553-3821, email: T2@spawar.navy.mil. Reference Navy Case No. 96128.

BACKGROUND OF THE INVENTION

Electromagnetic radiation traveling through Earth's upper atmosphere is subject to distortion due to a host of constantly changing conditions such as the ionosphere, solar radiation, solar wind, other electrical disturbances, and temperature variations, to name a few. These changing conditions cause frequency drift in radio transmissions, and ambient noise in communications. Implementing signal processing techniques in hard real-time has proven challenging. Accounting for and modeling the exact ways a signal will be altered as it travels through the atmosphere is beyond the reach of current science. A method is needed for allowing adaptive waveform synthesis and evolution in hard real-time (~60 microseconds).

BRIEF DESCRIPTION OF THE DRAWINGS

Throughout the several views, like elements are referenced using like references.

DETAILED DESCRIPTION OF EMBODIMENTS

This method for adaptive waveform synthesis and evolution in hard real-time allows one to make real-time adjustments to a signal to compensate for upper atmospheric disturbances. This is accomplished by generating an initial signal, carefully monitoring any secondary harmonics resulting from modulation of the ionosphere, and making real-time changes to the initial signal until the actual modulated signal more accurately approximates the desired/target signal. This method combines hard real-time adaptive methods with evolutionary programs, which are capable of modifying and/or augmenting a case base in near real-time through the use of one or more co-processors.

Figure 1:
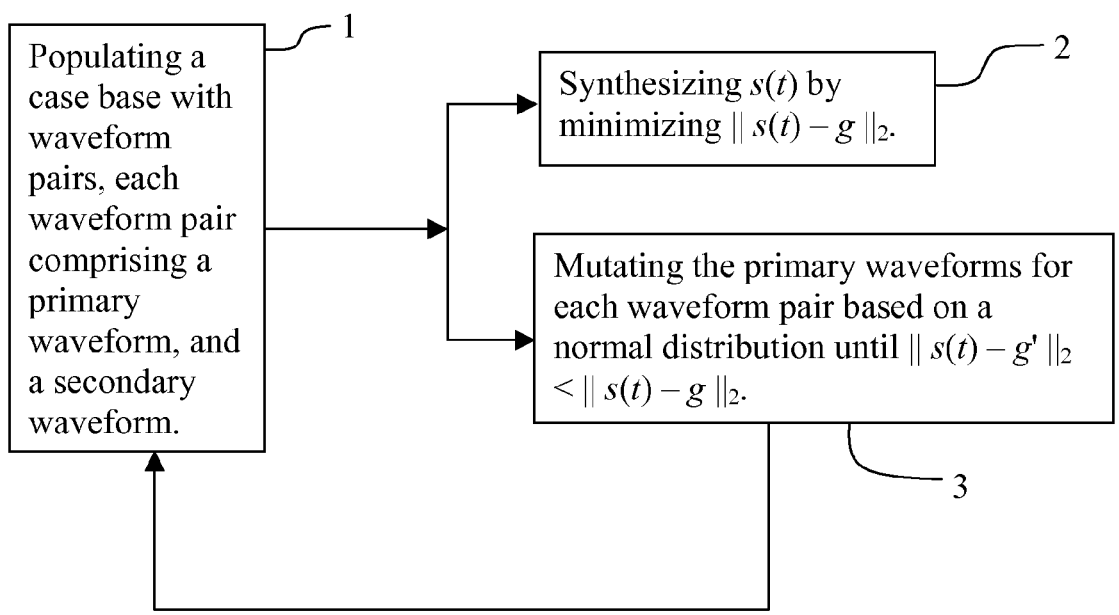
FIG. 1 is a flowchart showing a method for hard real-time adaptive wave modulation.

FIG. 1 depicts a method for hard real-time adaptive wave modulation. In step 1, a case base 10 is populated with waveform pairs 20. Each waveform pair 20 comprises a primary waveform 30, and a secondary waveform 40, which are saved as an array in the case base 10. The use of the case base 10 serves to enhance performance and allows the method to be performed in real-time. The primary waveform 30 induces the secondary waveform 40. In other words, the secondary waveform 40 is the atmospherically distorted primary waveform 30. For example, the primary waveform 30 may correspond to a transmitted low frequency radio signal and the secondary waveform 40 would correspond to the same radio signal only after it has been distorted by the atmosphere. Changing the primary waveform 30 necessarily causes a change in the secondary waveform 40. The relationship between the primary waveform 30 and the secondary waveform 40 may be expressed as $f(t) \rightarrow g(t)$, where $f(t)$ is the primary waveform 30 at time t, and $g(t)$ is the secondary waveform 40 at time t. The inverse waveform, $g^{-1}(t)$ gives $f(t)$ and is stored in the case base 10. In one embodiment, the primary waveform 30 is of strictly positive amplitude, and there is a direct relation between the period of the primary waveform 30 and the amplitude of the secondary waveform 40.

Step 2 involves synthesizing a known target waveform 50 by selecting waveform pairs 20 from the case base 10 such that the two-norm 60 of $\|s(t)-g\|_2$ minimized, where g is the secondary waveform 40, and $s(t)$ is the target waveform 50 at time t. In other words, the target waveform 50 is the pattern to which one tries to match the secondary waveform 40. The target waveform 50 may be any periodic trigonometric function, such as a simple sine wave. To illustrate, suppose that while a processor 70 is monitoring the secondary waveform 40, the processor 70 notices that the secondary waveform 40 is starting to stray from the target waveform 50. In this case, the processor 70 would then select and generate another primary waveform 30 from the case base 10 to correct the perceived difference between the secondary waveform 40 and the target waveform 50. As a result, the secondary waveform 40 will have delayed leading and trailing edges and expanded rise and fall times when compared to the target waveform 50.

Different memory management schemes may be used to randomize the representation of the primary waveform 30, while accounting for an associated de-convolution penalty. In one example embodiment, Denning's cache concept may be used whereby the most frequently used primary waveforms 30 are retrieved in their de-convolved form. Less frequently used primary waveforms 30 are stored in the case base 10 in a hierarchy of convolved forms and are de-convolved (one level) upon reference. The basis for "aging" the case base 10 is an assigned penalty function for de-convolution. The penalty function may be determined by the cost or metric for the inconvenience of having asynchronous discontinuities (spikes) in the target waveform 50. The use of sparse matrix techniques for convolving the primary waveform 30, while providing for much better utilization of the memory space in case base 10, will slow the process down in view of the need for additional address calculations (de-convolution). The use of numerical quadratures, such as trigonometric functions or collocating polynomials, would be similar. The response time of a system utilizing this process may be minimized where all primary waveforms 30 are discretized and stored in the form of array-based cases, such as the case base 10. To explain further, in an exemplary discretized grid, the mesh size is governed by the memory requirements as well as the tolerance for error. That is, the less the tolerance for error, the finer the mesh size and the greater the memory requirements. The use of a finer mesh size implies that a greater number of array references will be needed to retrieve a primary waveform 30 of the same duration. This can be mitigated through the use of anticipatory caching; whereby, a limited number of primary waveforms 30 are pre-retrieved and cached for a coarser mesh size in anticipation of being referenced. The best mesh size is hardware dependent and must be chosen experimentally.

Referring back to FIG. 1, step 3 involves mutating the primary waveforms 30 for each waveform pair 20 based on a normal distribution until $\|s(t)-g'\|_2 < \|s(t)-g\|_2$ where g' is a new secondary waveform 40 induced by the mutated primary waveform 30. This step is accomplished by initializing the primary waveform 30 to a random configuration and thereafter continuously varying the primary waveform 30 based on a normal distribution around the current definition. The distribution is used to determine such parameters as pulse width, amplitude, and rates of rise and fall on the leading and trailing edges of the primary waveform 30. The waveform pairs 20 may be automatically acquired through a random exploration and feedback loop as described below in regards to FIG. 2.

The synthesis of the target waveform 50 may be accomplished with a processor 70. At least one co-processor 80 may be used to perform other steps in the method such as effecting Gaussian mutations of the primary waveform 30, evolving a new best primary waveform 30, and saving the new best primary waveform 30 in the case base 10 whenever the value of δ is exceeded by all other waveform pairs 20 in the case base 10. The processor 70 and at least one co-processor 80 work together to interlace the synthesis of the target waveform 50 with a synchronized test of a secondary waveform 40 induced by a mutated primary waveform 30.

Figure 2:
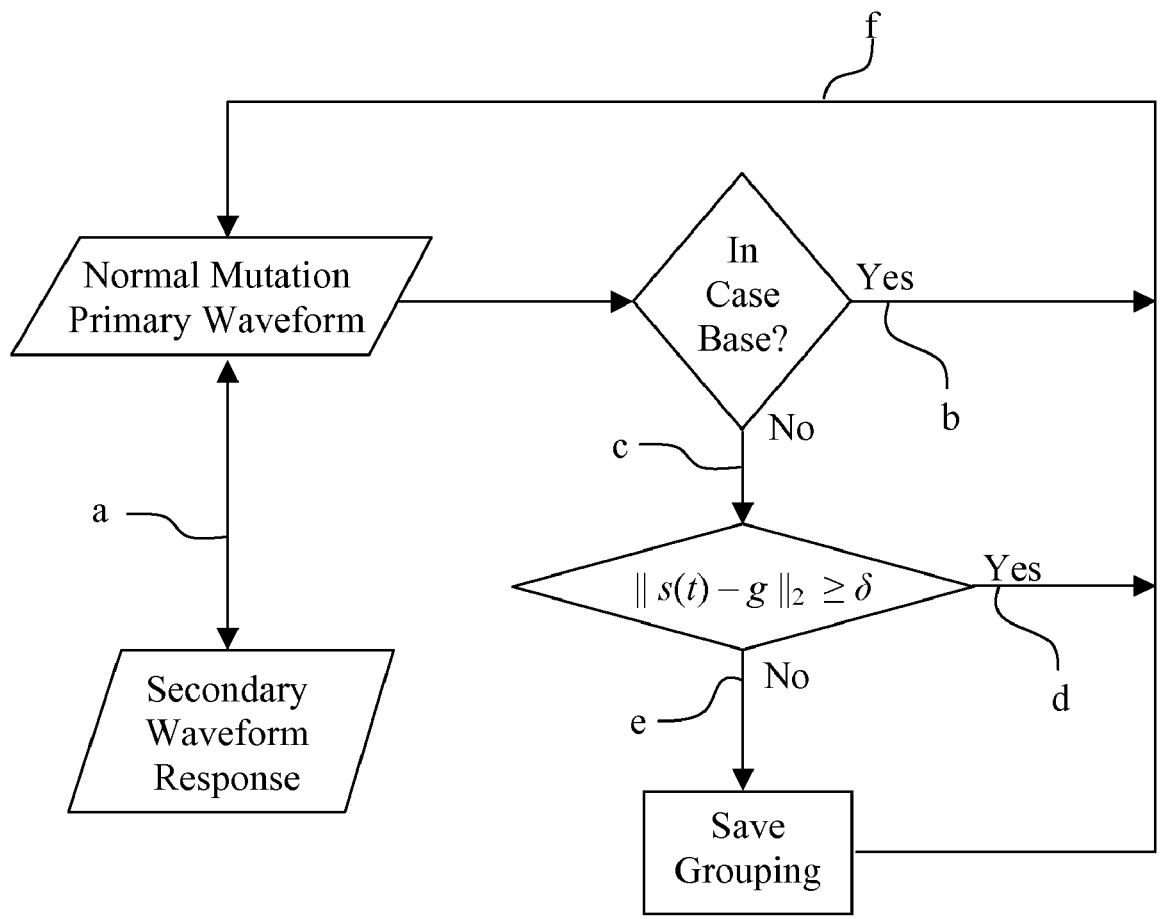
FIG. 2 is a flowchart showing conceptual evolutionary acquisition of primary-secondary waveform pairings.

FIG. 2 shows how the case base 10 may be filled with waveform groups 20. First, a continuous primary waveform 30 is randomly generated to induce the secondary waveform 40, indicated by reference character a in FIG. 1. If the primary waveform 30 is not already in the case base (reference c), the secondary waveform 40 that is induced by the primary waveform 30 is used to determine whether the two-norm 60 is greater than or equal to δ. The variable δ is an experimentally obtained threshold constant. If the two-norm is less than this constant (reference e), then the primary, and secondary waveforms 30 and 40 are saved as a waveform pair 20 in the case base 10. If the two-norm is greater than or equal to δ (reference d), or if the primary waveform 30 is already in the case base 10 (reference b), then a normally distributed mutation of the primary waveform 30 is generated to induce g'—a new secondary waveform 30 (reference f). The process then repeats itself with the new waveform pair 20. If the constant δ is chosen to be too close to zero, then the case base 10 will grow to be too large and either not cover the desired primary waveform 30 space, or require excessive memory. Conversely, if the constant δ is chosen to be too large, then the case base 10 may still cover the desired primary waveform 30 space, but it will necessarily be limited in the number of basis waveforms that it can acquire. As a consequence, the secondary waveform 40 will inaccurately match the target waveform 50 with spikes above the target waveform 50, followed by spikes below it. The value of the constant δ depends on the accuracy requirements and the hardware limitations of a given application.

Figure 3:
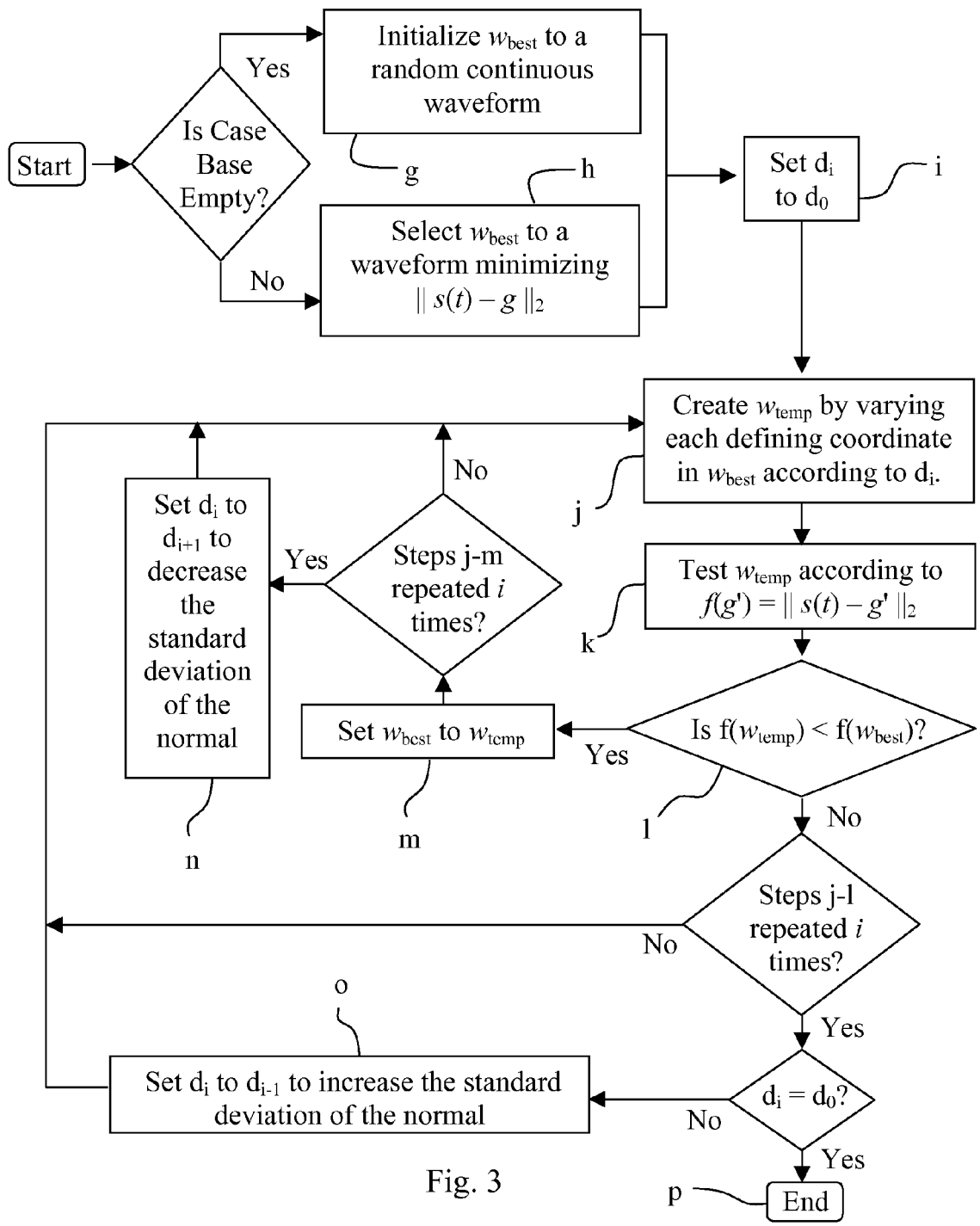
FIG. 3 is a flowchart showing how a processor determines when to evolve waveforms in a case base.

FIG. 3 is a flowchart showing how the processor 70 determines when to evolve the primary waveforms 30 in the case base 10. In step g, the primary waveform 30 is initialized to a random continuous waveform if the case base 10 is empty. Next, in step h, a best primary waveform 30 $w_{best}$ may be created by initializing the primary waveform 30 to a configuration having a minimal two-norm 60. Then, in step i, the normal distribution $d_i$ is set to the flattest distribution available $d_0$. In step j, a temporary primary waveform 30 $w_{temp}$ may be created by varying each defining coordinate in $w_{best}$ according to the current distribution. Then, in step k, $w_{temp}$ is then tested according to the equation: $f(g')=\|s(t)-g'\|_2$. In step 1, $w_{temp}$ becomes the new $w_{best}$ if $f(w_{temp})<f(w_{best})$. Step m involves repeating steps k-m i times, where i is a user-defined integer. Next, in step n, if $f(w_{temp})<f(w_{best})$, the standard deviation of the normal distribution is decreased to $d_{i+1}$ and steps j-m are repeated. Step o involves increasing the standard deviation of the normal distribution to $d_{i-1}$ and repeating steps j-1 if $(w_{temp})\geq f(w_{best})$ and the current distribution is the not the flattest distribution available. Finally, in step p, the mutation process may be exited if $(w_{temp})\geq f(w_{best})$ and the current distribution $d_i$ is the flattest distribution $d_0$ available.

Figure 4:
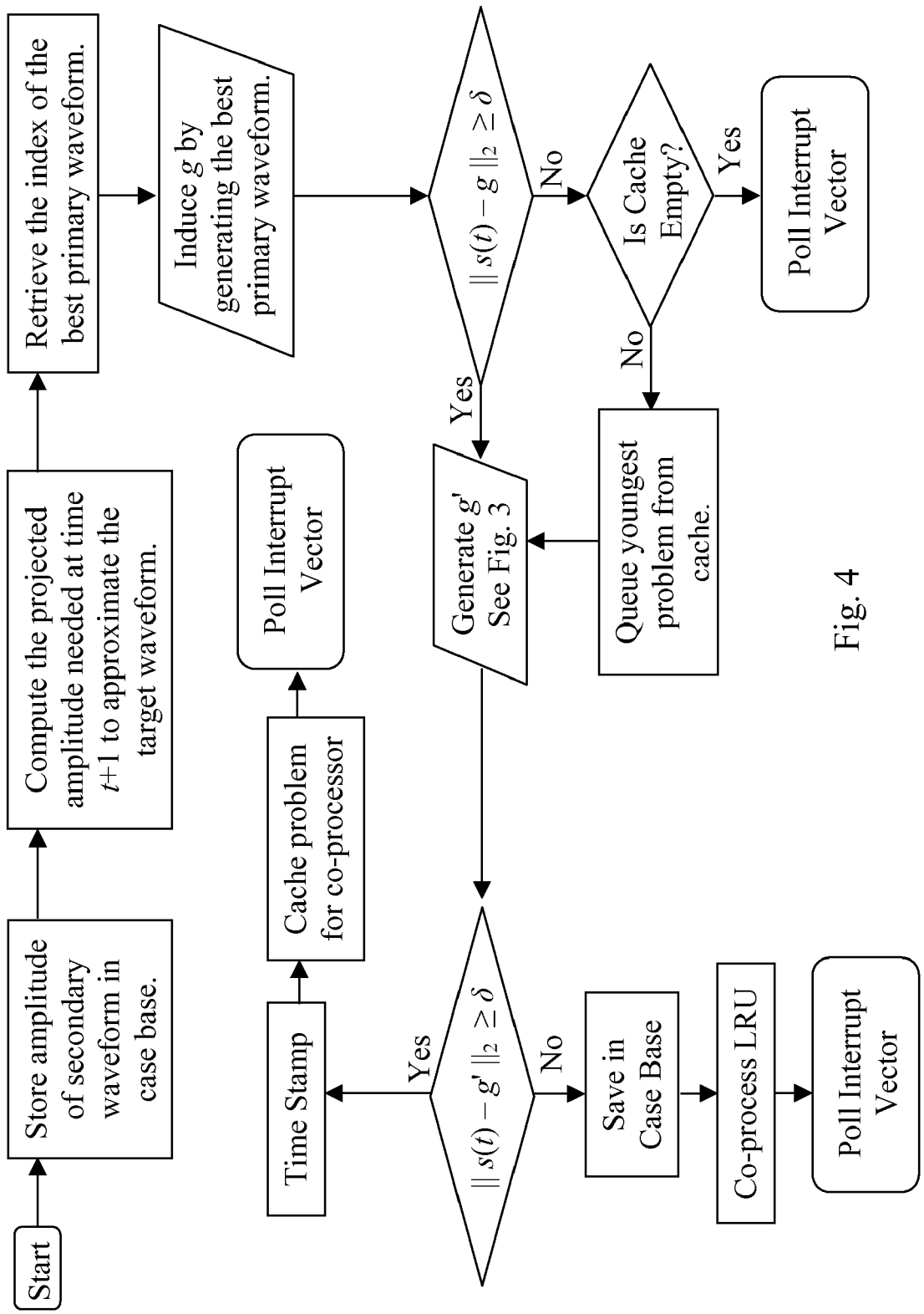
FIG. 4 is a flowchart showing how a co-processor evolves waveforms in a case base.

FIG. 4 is a flowchart showing how the processor 70 and a coprocessor 80 perform the evolution of the primary 30 and secondary 40 waveform pairings 20 in the case base 10. When a secondary waveform 40 is induced, its maximum amplitude is determined and then stored with its corresponding primary waveform 30 in a waveform pair 20 in the case base 10. The amplitudes of the secondary waveforms 40 may be stored as intervals. For example, instead of amplitudes of 1, 2, 3, . . . the amplitudes may be stored as [0.5, 1.5), [1.5, 2.5), [2.5, 3.5), and so on to facilitate pattern matching. Next, either the processor 70 or a co-processor 80 may be used to compute the projected amplitude needed at time t+1 to approximate the target waveform 50. The case base 10 is then queried with the projected amplitude to retrieve the index of the closest secondary waveform 40 and its associated primary waveform 30. The primary waveform 30 is then generated to induce the secondary waveform 40, or g. Use g to determine whether $\|s(t)-g\|_2 \geq \delta$. If the two-norm is greater than or equal to δ then the primary waveform 30 is mutated, as explained above and shown in FIG. 3, in order to induce g', the new secondary waveform 40. If the two-norm is less than δ then that waveform pair is still considered to be an adequate match to the target waveform 50. The next step is to determine if a problem cache 100 is empty. If the problem cache 100 is empty an interrupt vector 110 is then polled. If the problem cache 100 is not empty the youngest problem 120 in the problem cache 100 is then retrieved. A problem 120 is any waveform pair 20 having a two-norm that is greater than or equal to δ. Once retrieved from the problem cache 100, the youngest problem 120 is then queued and its primary waveform 30 is mutated to induce a new secondary waveform 40 g'. Whenever a new secondary waveform 40 g' is induced it is used to determine whether $\|s(t)-g'\|_2 \geq \delta$. With regards to g', if the two-norm is less than δ then its associated waveform pair 20 is saved in the case base 10. Once a waveform pair 20 has been saved in the case base 10, a Least-Recently-Used (LRU) memory management policy may be employed by the co-processor 80, which is based on the time stamps of the problems 120, as described below. After the LRU policy has been the interrupt vector 110 is polled. Referring back to g', if the two-norm is greater than or equal to δ its associated waveform pair 20 is time stamped and cached in the problem cache 100 as a problem 120 to be dealt with later by the co-processor and the interrupt vector 110 is polled.

From the above description of the method for hard real-time adaptive waveform synthesis and evolution, it is manifest that various techniques may be used for implementing the concepts of the method without departing from its scope. The described embodiments are to be considered in all respects as illustrative and not restrictive. It should also be understood that the method is not limited to the particular embodiments described herein, but is capable of many embodiments without departing from the scope of the claims.

I claim:

1. A method for hard real-time adaptive wave modulation, comprising the following steps:

populating a case base with waveform pairs, each waveform pair comprising a primary waveform, and a secondary waveform, wherein the primary waveform induces the secondary waveform;

synthesizing a known target waveform s(t) by selecting waveform pairs from the case base such that the expression $\|s(t)-g\|_2$ is minimized, where g is the secondary waveform; and mutating the primary waveforms for each waveform pair based on a normal distribution until $\|s(t)-g'\|_2 < \|s(t)-g\|_2$ where g' is a new secondary waveform induced by the mutated primary waveform.

2. The method of claim 1, wherein the step of populating the case base further comprises:
  a. inducing the secondary waveform by randomly generating a continuous primary waveform;
  b. generating a normally distributed mutation of the primary waveform and repeating steps a-b, if the primary waveform is already in the case base;
  c. if the primary waveform is not in the case base, determining whether $\|s(t)-g\|_2 \geq \delta$ where $\delta$ is an experimentally obtained threshold constant;
  d. repeating steps a-d if $\|s(t)-g\|_2 \geq \delta$;
  e. if $\|s(t)-g\|_2 < \delta$, saving the primary, and secondary waveforms as a pair in the case base; and
  f. repeating steps a-e.

3. The method of claim 2, wherein the step of mutating the primary waveform further comprises:
  g. initializing the primary waveform to a random continuous waveform if the case base is empty;
  h. if the case base is not empty, selecting a best primary waveform $w_{best}$ from the case base that has the smallest $\|s(t)-g\|_2$ of all the waveform pairs in the case base;
  i. setting a normal distribution $d_i$ to the flattest distribution available $d_0$, where i is an index;
  j. generating a temporary primary waveform $w_{temp}$ by varying each defining coordinate in $w_{best}$ according to $d_i$;
  k. testing the secondary waveform associated with $w_{temp}$ according to the equation: $f(g')=\|s(t)-g'\|_2$;
  l. replacing $w_{best}$ with $w_{temp}$ if $f(w_{temp}) < f(w_{best})$;
  m. repeating steps k-m n times, where n is a user-defined integer;
  n. decreasing the standard deviation of the normal distribution to $d_{i+1}$ and repeating steps k-n if $f(w_{temp}) < f(w_{best})$;
  o. increasing the standard deviation of the normal distribution to $d_{i-1}$ and repeating steps k-n if $(w_{temp}) \geq f(w_{best})$ and the current distribution $d_i$ is the not the flattest distribution available $d_0$; and
  p. exiting the mutation process if $(w_{temp}) \geq f(w_{best})$ and the current distribution $d_i$ is the flattest distribution available $d_0$.

4. A method for hard real-time adaptive wave modulation, comprising the following steps:
  synthesizing a target waveform with a secondary waveform that is induced by a primary waveform;
  using a processor to perform the following steps:
    effecting Gaussian mutations of the primary waveform;
    evolving a new best primary waveform;
    saving the new best primary waveform in a case base whenever the value of $\delta$ is exceeded by all other waveform pairs in the case base, where $\delta$ is an experimentally obtained threshold constant; and
  using at least one co-processor to interlace the synthesis of the target waveform with a synchronized test of a new secondary waveform, wherein the new secondary waveform is induced by a mutated primary waveform.

5. The method of claim 4, further comprising:
  generating the primary waveform to induce the secondary waveform;
  determining the maximum amplitude of the secondary waveform;
  storing the secondary waveform, its amplitude, and the primary waveform as a pair in a case base;
  computing the projected amplitude needed at time t+1 to approximate the target waveform;
  referencing the case base with the projected amplitude to retrieve the index of a best primary waveform;
  generating g' using a normally distributed mutation of the best primary waveform only if $\|s(t)-g\|_2 \geq \delta$ where $\delta$ is an experimentally obtained threshold constant, g is the secondary waveform, g' is a new secondary waveform induced by the normally distributed mutation of the best primary waveform, and s(t) is the target waveform at time t.

6. The method of claim 5, further comprising:
  performing the following steps if $\|s(t)-g\|_2 < \delta$:
    polling an interrupt vector if a problem cache is empty;
    retrieving a youngest problem from the problem cache if the problem cache is not empty;
    generating g' using a normally distributed mutation of the best primary waveform;
  performing the following if $\|s(t)-g'\|_2 \geq \delta$:
    creating a g' problem;
    time stamping the g' problem;
    caching the g' problem; and
  implementing a least-recently-used memory management policy based on the time stamps.

7. The method of claim 6, wherein the amplitudes of the secondary waveforms are stored in intervals in the case base.

8. The method of claim 7, wherein the primary and secondary waveforms are low frequency.

9. The method of claim 8, wherein the primary waveform is restricted to positive amplitudes.

10. The method of claim 9, wherein the primary waveform is saved in the case base in a discretized form.

* * * * *